W. H. GESKE & C. EVANS.
POTATO CUTTER.
APPLICATION FILED JULY 9, 1913.

1,083,081.

Patented Dec. 30, 1913.

2 SHEETS—SHEET 1.

Witnesses
M. D. Slifer
K. Peacock

Inventors
William H. Geske &
Charley Evans

By Victor J. Evans
Attorney

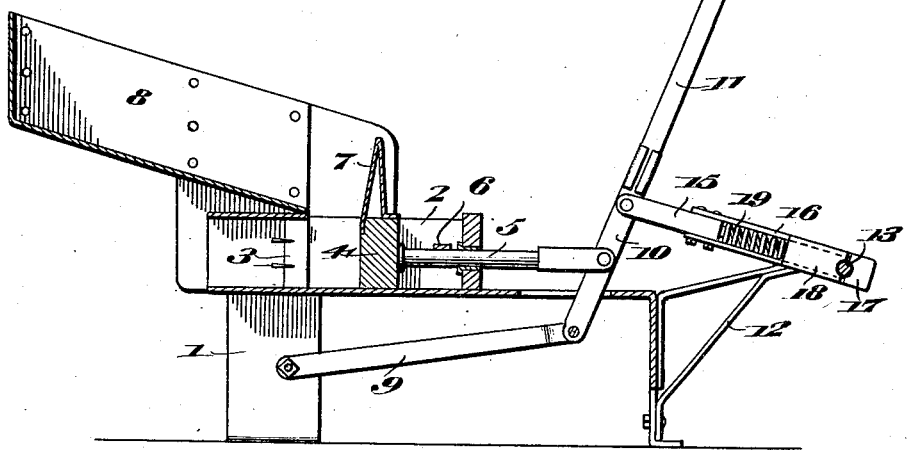

UNITED STATES PATENT OFFICE.

WILLIAM H. GESKE AND CHARLEY EVANS, OF PAGE, NORTH DAKOTA.

POTATO-CUTTER.

1,083,081.

Specification of Letters Patent. Patented Dec. 30, 1913.

Application filed July 9, 1913. Serial No. 778,164.

*To all whom it may concern:*

Be it known that we, WILLIAM H. GESKE and CHARLEY EVANS, citizens of the United States, residing at Page, in the county of Cass and State of North Dakota, have invented new and useful Improvements in Potato-Cutters, of which the following is a specification.

This invention relates to potato cutters and it consists in the novel features hereinafter described and claimed.

An object of the invention is to provide a potato cutter which may be operated either manually or by the use of power and which is automatic in its actions in cutting or slicing potatoes.

With the above object in view the cutter includes a frame having a trunk mounted thereon with a plunger slidably mounted in the trunk. Means is provided for reciprocating the plunger. The plunger is provided at its upper edge with a shield and at the delivery end of the trunk is provided a series of knives arranged in cruciform relation. A hopper is located above the trunk and is arranged to deliver the potatoes into the trunk between the plunger and the knives.

Figure 1:
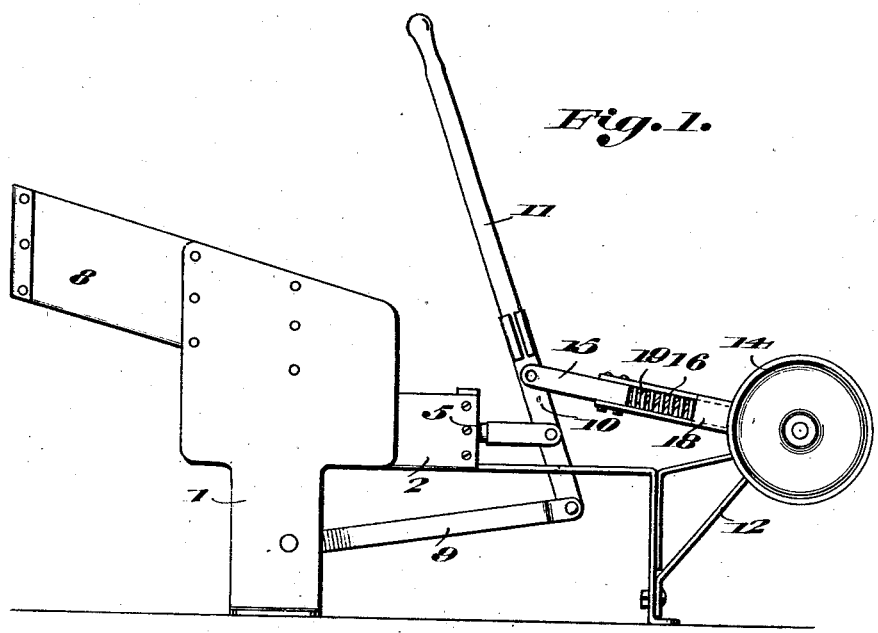
Figure 2:
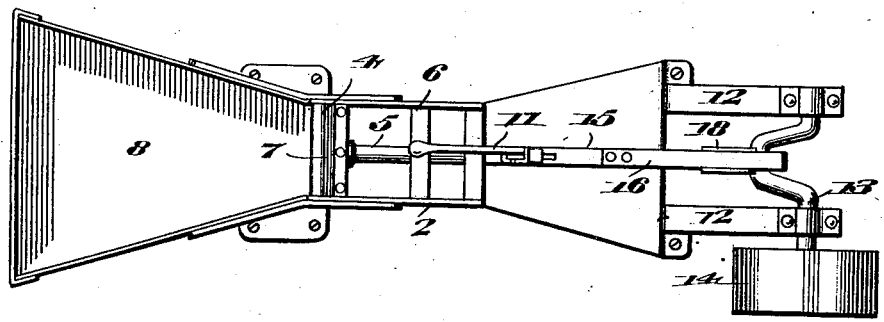

In the accompanying drawing:—Figure 1 is a side elevation of the cutter. Fig. 2 is a top plan view of the same. Fig. 3 is a longitudinal sectional view of the same. Fig. 4 is an end view of the same. Fig. 5 is a transverse sectional view of the same. Fig. 6 is a perspective view of the plunger of the cutter.

The potato cutter includes a frame 1 upon which is mounted a trunk 2. A series of knives 3 is arranged at the delivery end portion of the trunk 2 and these knives are in cruciform relation with respect to each other. A plunger 4 is slidably mounted in the trunk 2 and is attached to a stem 5 which is guided through one end of the said trunk. A cross bar 6 passes transversely through the trunk 2 and extends over the upper side of the intermediate portion of the stem 5 and serves to hold the plunger down against the bottom of the trunk 2. The plunger 4 is provided at its upper edge with an upstanding shield 7. A hopper 8 having an inclined bottom is located above the delivery end portion of the trunk 2 and the delivery edge of the bottom of the said hopper is located above the inner edges of the knives 3. Links 9 are pivotally connected with the frame 1 below the trunk 2 and the lower end of lever 10 is pivotally connected with the free ends of the said links 9. The lever 10 is also pivotally connected at a point between its ends with the end of the stem 5. A handle extension 11 is detachably connected with the upper end of the lever 10. Brackets 12 are mounted at one end of the frame 1 and a crank shaft 13 is journaled for rotation in said bracket. A pulley 14 is mounted on one end portion of the shaft 13 and a resilient connecting rod 15 connects the crank of the shaft 13 with the lever 10 at a point above the point of pivotal connections between the said lever and the said stem 5. The connecting rod 15 includes an elongated yoke 16 having a block 17 fixed at the end thereof and which serves as a half bearing for the crank of the shaft 12. A block 18 is movably mounted in the yoke 16 and also serves as a half bearing for the crank of the said shaft. A spring 19 is interposed between the body portion of the rod 15 and block 18 and the said spring is under tension with a tendency to hold the block 18 toward the block 17.

In operation the potatoes are placed in the hopper 8 and they gravitate down along the inclined bottom thereof into the trunk 2 between the knives 3 and the plunger 4. The plunger 4 is then reciprocated by using the handle 11 and lever 10 whereby the said plunger is moved back and forth in the trunk. As the plunger moves toward the knives the potatoes are forced between the knives and are cut in sections. As the plunger moves away from the knives other potatoes roll from the hopper 8 down into the trunk 2 and the shield 7 carried at the upper edge of the plunger 4 serves to prevent the potatoes from rolling over the upper edge of the plunger. When power is applied to the shaft 13 by training a belt around the pulley 14 or otherwise the said shaft is rotated and the crank thereof is carried around with the same. The movement of the crank around the axis of the shaft 12 reciprocates the connecting rod 15 which in turn reciprocates the stem 5 and the attached plunger 4 whereby the potatoes are cut into sections as above described. In the event that a relatively hard object should lodge in the trunk 2 between the plunger and the knives and while the shaft 13 is being rotated by the use of power as the plunger presses the said object against the knives the block 18 will move away from the block 17 against the spring 19 and consequently the crank of the shaft 13 may continue to describe its rotation about the axis of the shaft without compelling the plunger to damage the knives by forcing the relatively hard object between them. Furthermore the presence of the spring 19 between the block 18 and the body of the rod 15 will serve as means for resiliently presenting the plunger to the potatoes so that the potatoes will be evenly cut and not torn or forcibly pressed between the knives.

Having described the invention what is claimed is:—

A cutter comprising a trunk, a hopper located above the trunk and having a bottom inclined downwardly toward its delivery edge, a series of knives mounted in the trunk below the lower portion of the bottom of the hopper, a plunger mounted in the trunk for reciprocatory movement toward and away from the delivery edges of the hopper bottom, and a shield mounted upon the plunger and extending above a horizontal line on a level with the delivery edge of the hopper bottom.

In testimony whereof we affix our signatures in presence of two witnesses.

WILLIAM H. GESKE.
CHARLEY EVANS.

Witnesses:
T. A. THOMPSON,
G. E. DOYLE.